United States Patent
Porret

(10) Patent No.: US 9,314,787 B2
(45) Date of Patent: Apr. 19, 2016

(54) PROTECTIVE DEVICE FOR COVERING AN INTERFACE BETWEEN STERILE CHAMBERS

(75) Inventor: Jean-Yves Porret, Gieres (FR)

(73) Assignee: Becton, Dickinson and Company, Franklin Lakes, NJ (US)

( * ) Notice: Subject to any disclaimer, the term of this patent is extended or adjusted under 35 U.S.C. 154(b) by 1863 days.

(21) Appl. No.: 10/497,952

(22) PCT Filed: Dec. 13, 2002

(86) PCT No.: PCT/FR02/04357
§ 371 (c)(1),
(2), (4) Date: Apr. 1, 2005

(87) PCT Pub. No.: WO03/053784
PCT Pub. Date: Jul. 3, 2003

(65) Prior Publication Data
US 2005/0168117 A1    Aug. 4, 2005

(30) Foreign Application Priority Data
Dec. 14, 2001 (FR) .................... 01 16254

(51) Int. Cl.
*G21F 5/018* (2006.01)
*B01L 1/02* (2006.01)
*G21F 7/005* (2006.01)
*G21F 7/047* (2006.01)

(52) U.S. Cl.
CPC . *B01L 1/02* (2013.01); *G21F 7/005* (2013.01); *G21F 7/047* (2013.01); *Y02E 50/30* (2013.01)

(58) Field of Classification Search
CPC ........... G21F 5/018; G21F 5/015; G21F 5/12; G21F 5/00; G21F 7/005; G21F 7/00
USPC .............. 220/826, 729, 256.1, 848, 849, 817, 220/824; 141/22, 392, 346, 231, 357, 370; 312/291; 232/25, 43.3, 44; 414/288; 49/506
See application file for complete search history.

(56) References Cited

U.S. PATENT DOCUMENTS

| | | | |
|---|---|---|---|
| 2,678,252 A * | 5/1954 | Swearingen | 312/223.5 |
| 4,260,312 A * | 4/1981 | Hackney | 414/292 |
| 4,310,034 A | 1/1982 | Guilloteau et al. | |
| 5,226,781 A * | 7/1993 | Glachet et al. | 414/217 |
| 5,447,699 A | 9/1995 | Papciak et al. | |
| 5,460,439 A * | 10/1995 | Jennrich et al. | 312/1 |
| 6,553,722 B1 | 4/2003 | Porret et al. | |
| 6,779,567 B1 * | 8/2004 | Szatmary | 141/51 |

FOREIGN PATENT DOCUMENTS

FR      2 787 190 A1    6/2000
FR      2 787 235 A1    6/2000

* cited by examiner

*Primary Examiner* — Anthony Stashick
*Assistant Examiner* — Blaine Neway
(74) *Attorney, Agent, or Firm* — The Webb Law Firm

(57) ABSTRACT

A protective device (20) is provided to equip a sterile enclosure (1) configured to be placed in communication with another sterile enclosure (2) so as to allow objects to be transferred from one enclosure to the other. The protective device (20) covers an interface defined between the sterile enclosures (1, 2).

17 Claims, 4 Drawing Sheets

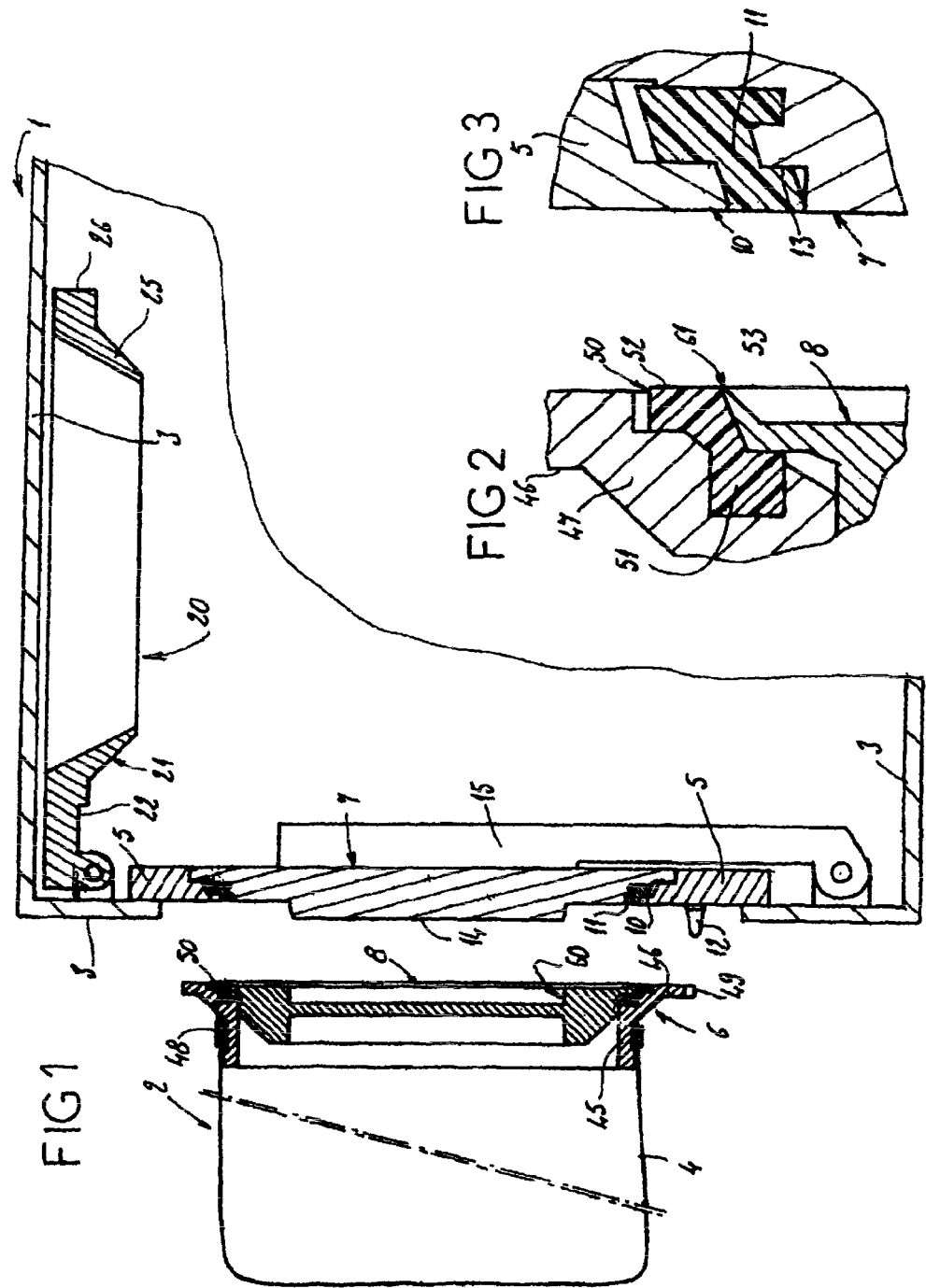

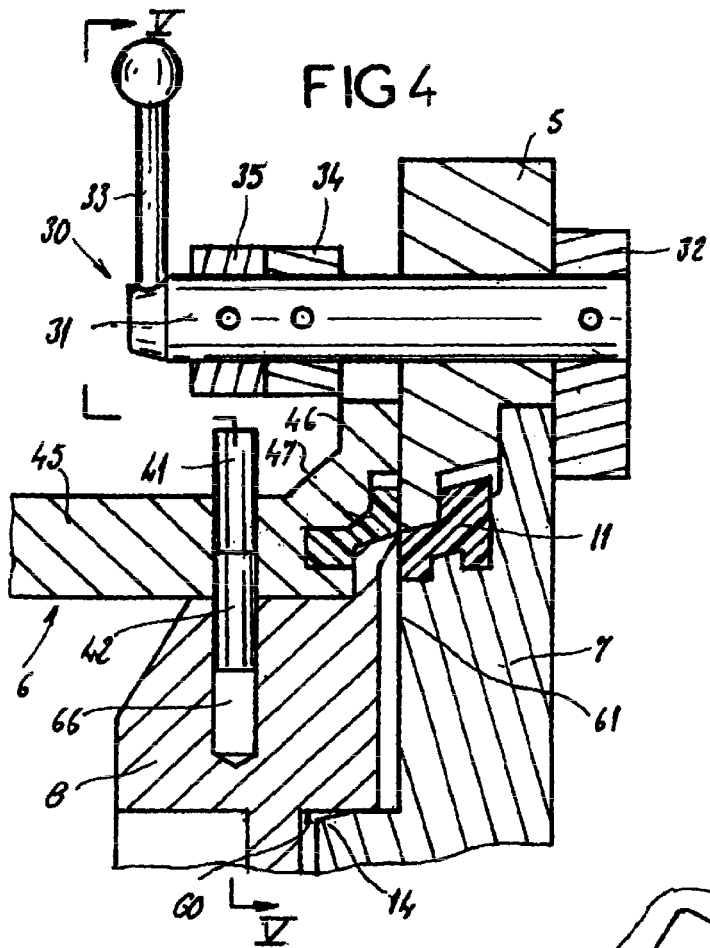
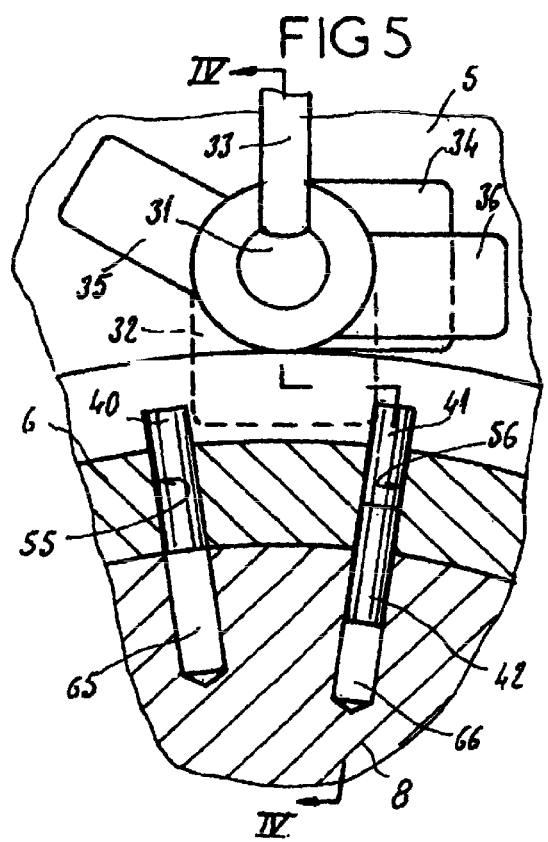

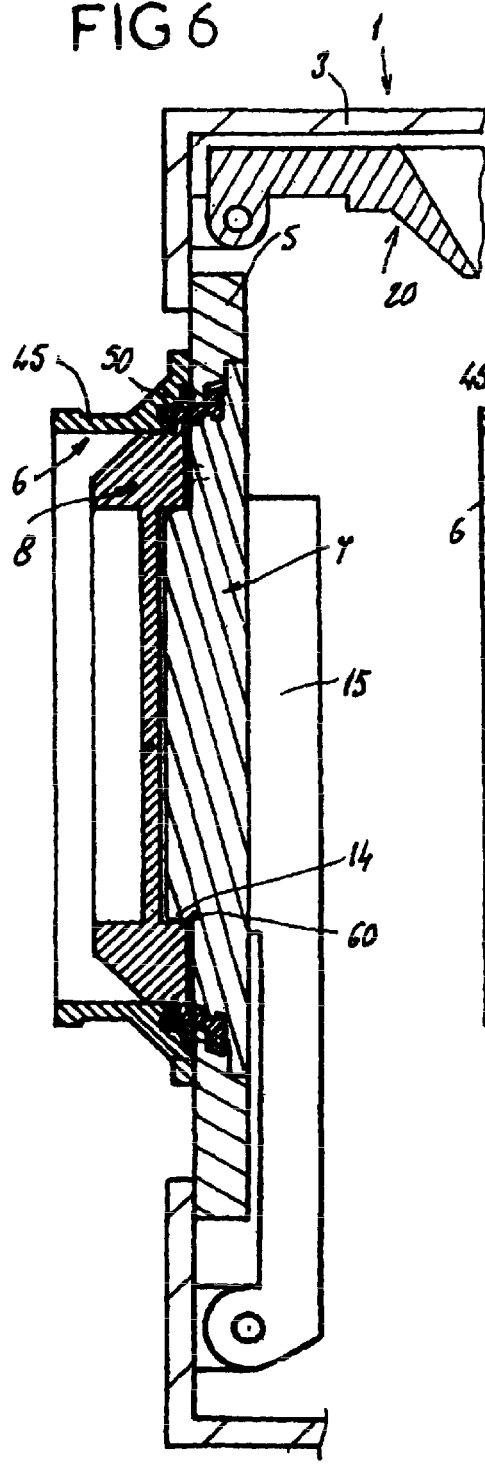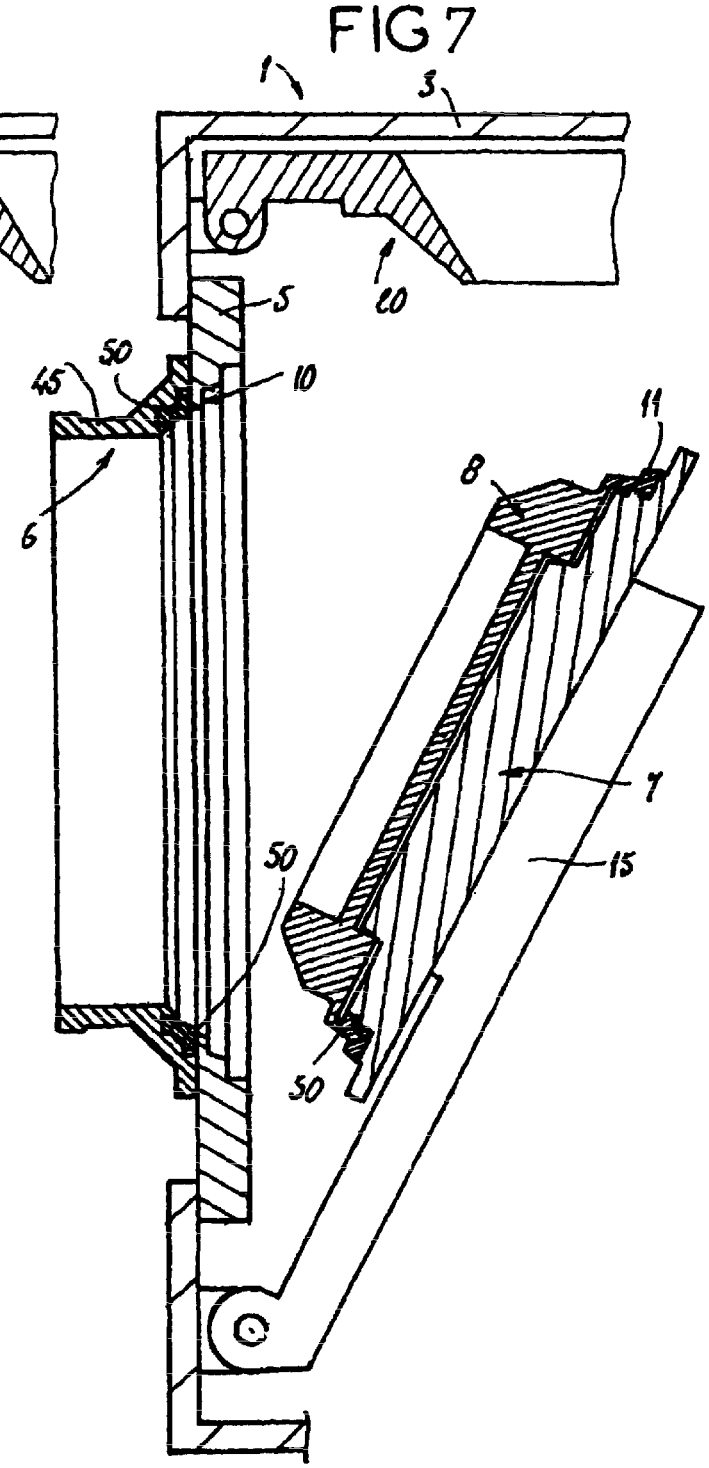

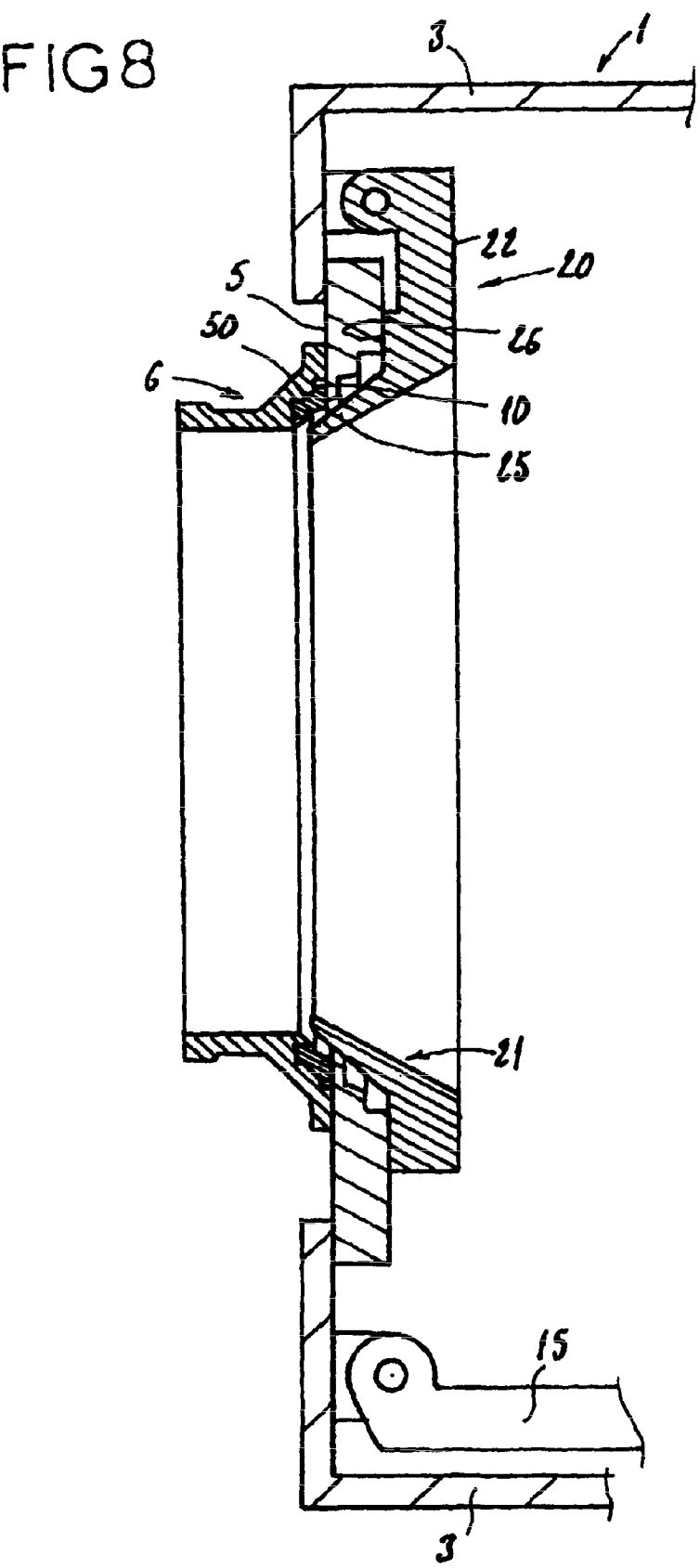

PROTECTIVE DEVICE FOR COVERING AN INTERFACE BETWEEN STERILE CHAMBERS

The present invention relates to a protective device for protecting a sterile enclosure likely to be placed in communication with another sterile enclosure so as to allow objects to be transferred from one enclosure to the other.

To make a distinction between these two enclosures, the first enclosure mentioned will henceforth be known as the "first enclosure", while the second enclosure mentioned will henceforth be known as the "second enclosure".

The first enclosure may in particular be an enclosure in which work needs to be performed on sterile components, and the second enclosure may in particular be an enclosure allowing these sterile components to be transferred, before or after said work is finished.

The invention finds a particularly advantageous application in enclosures used for assembling syringe parts. The first enclosure is the one in which this assembly is performed, and the second enclosure generally comprises a flexible bag made of a plastic material, for receiving parts or collections of parts that are to be transferred.

To place them in communication with one another, these enclosures comprise flanges for sealed connection of one enclosure to the other and are equipped with access doors accommodated, with sealing, in these flanges.

In an existing type of enclosure, described in documents FR 98 15850 and FR 98 15851 in the name of the Applicant Company, the peripheral edges of the doors of the two enclosures press closely together when the enclosures are connected, via a seal that at least one of these doors comprises, then these doors are connected together by magnetic means and by pulling a vacuum between the doors. The contaminated space delimited by these doors and these peripheral edges is thus confined. Means are then actuated to release these doors and place the two enclosures in communication with one another.

These existing enclosures are satisfactory in practice, but it has been possible to observe that there are still some risks of the working enclosure becoming contaminated.

U.S. Pat. No. 4,310,034 describes a device for connecting a container for transporting nuclear fuel to a horizontal unloading wall, using a funnel that comes into contact with the region of the container forming the seat of the door of said container.

The present invention sets out to overcome this essential drawback by providing a protective device capable of eliminating any risk of contamination of a first enclosure by a second enclosure following these enclosures being placed in communication with one another.

The present invention relates to a protective device for protecting a sterile enclosure likely to be placed in communication with another sterile enclosure so as to allow sterile parts to be transferred from one enclosure to the other for the purpose of working on these parts, characterized in that it comprises:
- a protective component having a wall capable, when engaged in the openings delimited by the seats of the doors of the enclosures, of covering the interface where these two seats meet, without contact with this interface or with the surrounding regions, and
- positioning means allowing this wall to be positioned with respect to this interface in this contactless covering position.

This protective component is contained in one of the enclosures and is placed in this contactless covering position immediately after the doors of the enclosures have been opened. It makes it possible to prevent any of the objects being transferred, of the packagings of these objects and/or of the gloves or garments of the operator from coming into contact with the seal located at the interface where the seats of the doors meet.

This is because there is a risk that seal might be touched or moved, even very slightly, by said objects, packagings, gloves or garments when these are transferred from one enclosure to the other. Such contact or movement, should it occur, would break the integrity of the contact of this seal with the surfaces against which this seal is applied, and would therefore place a contaminated space in communication with the atmosphere in the enclosures.

The invention thus makes it possible to completely eliminate this risk of contact or of movement and therefore solves the remaining risks of contamination that the enclosures according to the prior art exhibit.

As a preference, said positioning means consist of one or more regions of the protective component, which are shaped to bear against the component delimiting the seat of one of the doors, at sterile locations thereof.

This positioning is thus achieved in a particularly simple way, particularly by the operator using just one hand.

According to one preferred embodiment of the invention, the protective device comprises at least one arm for supporting the protective component, which arm is connected on the one hand to this protective component and on the other hand to one of the walls of an enclosure, this arm allowing the protective component to be moved between said contactless covering position and a retracted position.

The protective component can thus easily be moved between its contactless covering and retracted positions and, in its retracted position, does not hamper the work performed in the enclosure.

The support arm may in particular be mounted so that it can pivot on the wall of the enclosure to which it is connected.

Advantageously, the protective device comprises means allowing the protective component to be immobilized in said contactless covering position, so that any risk of this component moving while objects are being transferred is eliminated.

These immobilizing means may, for example, comprise at least one latch or, if the device comprises a pivoting arm such as the aforementioned, blocking or clamping means acting between this arm and the axle of pivoting or between this axle and the bracket used for mounting this axle on the corresponding wall of the enclosure.

For a good understanding thereof, the invention is described once again hereinbelow with reference to the appended schematic drawing which, by way of nonlimiting example, depicts one preferred embodiment of the protective device to which it relates.

FIG. 1 is a view in longitudinal section of two sterile enclosures intended to be connected together; each enclosure for this purpose comprises a door which normally closes it, a flange forming the stationary frame of this door and a seal placed between this door and the flange;

FIG. 2 is a view in longitudinal section and on a larger scale of a portion of a peripheral edge of the door which closes one of these enclosures, of the corresponding flange and of the seal placed between this door and this flange;

FIG. 3 is a view similar to FIG. 2 of a portion of the peripheral edge of the door, of the flange and of the seal which close the other enclosure;

FIG. 4 is a part view in section on IV-IV of FIG. 5 and on a larger scale, of an assembly for locking the flanges together and of members for locking each door to the corresponding flange;

FIG. 5 is a view of this locking assembly and of the members in section on V-V of FIG. 4;

FIG. 6 is a part view of the enclosures, similar to FIG. 1, after these enclosures have been connected and before the doors have been opened;

FIG. 7 is a view of the enclosures, similar to FIG. 6, after the doors have been opened, and FIG. 8 is a view of the enclosures, similar to FIG. 7, after a protective device that one of the enclosures comprises has been placed in the region where the flanges meet.

FIG. 1 depicts a sterile enclosure 1 to which another sterile enclosure 2 is intended to be connected so as to allow objects to be transferred from the enclosure 2 to the enclosure 1 or vice versa.

The enclosure 1 is an enclosure in which work is to be performed on sterile components, for example assembling syringe parts. The enclosure 2 for its part is an enclosure allowing these sterile components to be transferred before or after said work has been completed. In the example depicted in the drawing, this enclosure 2 is a one-use enclosure, as will become apparent later on.

Each enclosure 1, 2 comprises walls 3, 4 respectively, which delimit its interior volume, a respective circular flange 5 or 6 and a respective access door 7 or 8. The flanges 5, 6 form the stationary frames that accommodate the doors 7, 8, with sealing, and are able to be connected together to place the enclosures 1 and 2 in communication, after which the doors 7, 8 are opened.

As shown more specifically in FIG. 3, the flange 5 of the enclosure 1 has a circular rim 10 projecting radially inward which forms sealing bearing surfaces against which a circular seal 11 mounted on the door 7 comes into close contact when this door 7 is in the closed position.

The flange 5 also comprises fingers 12 projecting from its face external to the enclosure 1, allowing the flange 6 to be positioned with respect to it.

The door 7 comprises an annular rib 13 for mounting the seal 11 and a central boss 14 projecting axially from its exterior face.

This door 7 is also connected to an arm 15 mounted so that it can pivot on one of the walls 3. This arm 15 allows the door 7 to pivot between the closed position depicted in FIG. 1 and a wide open position in which this door 7 is folded back against one of the walls 3.

This enclosure 1 also comprises a protective device 20 formed of an annular component 21 and of an arm 22 for supporting this component 21.

The component 21 comprises a portion 25 of frustoconical shape and a portion 26 of circular shape.

FIG. 8 shows that the portion 25 is sized so that, when the door 7 is in the open position, said portion can be engaged through the seat delimited by the flange 5 so as to cover the regions of the flange 5 that form this seat, to just beyond the exterior face of the rim 10 and of the seal 50 that the flange 6 has, and without contact with these regions.

Thus, the wall of the portion 25 is able, when engaged in the openings delimited by the seats of the doors (7, 8) of the enclosures (1, 2), to cover the interface where these seats meet, without contacting this interface or the surrounding regions, that is to say the regions of the flange 5 forming the seat of the door 7 as far as beyond the exterior face of the rim 10 and of the seal 50 that the flange 6 has.

The circular portion 26 is, for its part, shaped so that it comes into abutment against the side of the flange 5 that faces the interior of the enclosure 1 so as to position the portion 25 axially with respect to the flange 5 in this contactless covering position.

The arm 22 is mounted so that it can pivot on one of the walls 3 of the enclosure 1 and allows the component 21 to move between this contactless covering position and a retracted position shown in FIG. 1, in which the device 20 is folded back against one of the walls 3 and does not hamper work inside the enclosure 1.

The enclosure 1 further comprises assemblies 30 for locking the door 7 in the closed position, one of which assemblies is visible in FIGS. 4 and 5.

With reference to these figures, each assembly 30 comprises a shaft 31 mounted so that it is free to rotate in a bore passing through the flange 5, a latch 32 wedged onto one end of the shaft 31 protruding into the enclosure 1, and a lever 33 wedged onto the other end of the shaft 31, which protrudes from the enclosure 1. The latch 32 has the shape of a paddle and can occupy either an angular position in which it presses the door 7 against the flange 5 or an angular position in which it is situated radially outside this door 7 to allow movements thereof.

The shaft 31 also comprises, on the outside of the flange 5, as visible in FIG. 5, a latch 34 also in the shape of a paddle and two radial fingers 35, 36 wedged onto it. Thus, as can be understood from reference to FIGS. 4 and 5, the latch 34 can occupy either an angular position in which it presses the flange 6 against the flange 5 or an angular position in which it is situated radially outside this flange 6 to allow the latter to be set in place or removed with respect to the flange 5. FIG. 5 shows that the latch 34 is angularly offset from the latch 32 so that the latch 34 is retracted when the latch 32 holds the door 7 against the flange 5 and so that this latch 34 bears against the flange 6 before the latch 32 releases the door 7.

The radial fingers 35, 36 are also angularly offset and allow operation of pins 40, 41, 42 which are described later on, for unlocking/locking the door 8.

As regards the enclosure 2, the walls 4 are produced in the form of a bag made of a flexible and impervious plastic material.

The flange 6 has a tubular skirt 45 for its sealed connection to said bag, a wall 46 projecting radially outward and intended to be applied against the flange 5 and collaborate with the latch 34, and an intermediate region 47 forming the seat that accommodates the door 8.

The skirt 45 has a groove formed from its exterior face, accommodating hooping 48 which allows said bag to be joined in a sealed manner to it.

The wall 46 comprises notches 49 formed from its outer edge and intended to accommodate the fingers 12 when the flange 6 is brought into contact with the flange 5 with a view to connecting the enclosure 2 to the enclosure 1. These fingers 12 and notches 49 thus form means for positioning the flanges 6, 5 with respect to one another.

The intermediate region 47 forms, as shown by FIG. 2, a groove for receiving a seal 50 which provides sealing between this flange 6 and the door 8. This seal 50 has a mounting part 51 engaged in this groove, a front part 52 projecting slightly beyond the axial end face of the flange 6, and bearing surfaces 53 for accommodating the peripheral region 8a of the door 8.

Furthermore, as FIGS. 4 and 5 show, the flange 6 comprises two radial bores 55, 56 configured such that they are in line with the fingers 35 and 36 when the flange 6 is in contact with the flange 5, as shown in FIG. 4.

The door 8 comprises a recess 60 formed from its exterior face, so as to be able to accommodate snugly the boss 14 of the door 7, and has a peripheral rib 61 forming a ridge, intended to bear snugly against the seal 11 when the enclosures 1 and 2 are connected together.

This door 8 further comprises two blind radial bores 65, 66 of the same diameters as the bores 55 and 56 and which, when this door 8 is in the closed position shown in FIGS. 4 and 5, come respectively to face these bores 55 and 56.

The aforementioned locking pins 40, 41, 42 are engaged snugly in the bores 55, 56, 65, 66 but with the possibility of sliding therein.

As can be seen in FIGS. 4 and 5, before the enclosure 2 is connected with the enclosure 1, the pin 40 is partially engaged in the bore 55 so that its radially internal end lies flush with the internal radial face of the flange 6. It has a length such that its part protruding from the flange 6 is, when the flanges 6 and 5 are mated, in the angular displacement travel of the finger 35 and can be pushed in the radially internal direction of the flange 6 by this finger 35 during this travel.

Also before connecting the enclosure 2 with the enclosure 1, the pin 41 is partially engaged in the bore 56. It has a length such that when the flanges 6 and 5 are mated, its part protruding from the flange 6 is in the angular displacement travel of the finger 36 and can be pushed in the radially internal direction of the flange 6 by this finger 36 during this travel; the length of this pin 41 is also equal to the length of the bore 56.

Also before connecting the enclosure 2 with the enclosure 1, the pin 42 is partially engaged in the bore 56, behind the pin 41, and in the bore 66. It thus holds the door 8 in the closed position.

In practice, as shown by FIG. 6, the flanges 5 and 6 are mated and positioned with respect to one another by the engagement of the flange 6 on the fingers 12 and of the boss 14 in the cavity 60. The doors 7 and 8 are then connected together by appropriate means such as magnetic means and/or the pulling of a vacuum between the doors.

The levers 33 are then turned in the clockwise direction shown in FIG. 5 so as to engage the latch 34 behind the wall 46 and so as to disengage the latch 32 from behind the door 7. At the same time, the finger 36 presses against the pin 41 so as to fully engage the latter in the bore 56, this driving the pin 42 into the bore 66 and releasing the door 8.

The arm 15 can then pivot to bring the door 7 and the door 8 connected to it into the open position as shown in FIG. 7.

The device 20 is then pivoted from its retracted position shown in FIGS. 6 and 7 to its aforementioned contactless covering position shown in FIG. 8. In this position, the portion 26 of the component 21 rests against the interior face of the flange 5 and the portion 25 covers the interface where the flanges 5 and 6 meet, particularly the rim 10 and the seal 50. The objects or parts contained in one enclosure can then be transferred into the other enclosure without the risk of contact or of movement, even very slight, with or of the seal 50, and therefore without the risk of placing the atmosphere of the enclosures 1, 2 in communication with the contaminated region isolated by this seal 50.

To close and separate the enclosures 1, 2 again, the device 20 is brought into the retracted position and then the doors 7 and 8 are brought back into contact with their respective seats, after which the levers 33 are turned in the counterclockwise direction shown in FIG. 5, which causes the door 7 to be blocked by the latch 32 and the flange 6 to be released by the latch 34. During this movement, the finger 35 bears against the pin 40, which it pushes completely into the bore 55 and therefore into the bore 65, and this locks the door 8. The flange 6 is then separated from the flange 5 in such a way as to extract the boss 14 from the cavity 60.

As is apparent from the foregoing, the invention makes an appreciable improvement to the prior art, by providing a protective device 20 capable of eliminating any risk of an enclosure 1 becoming contaminated by the other enclosure 2 when these enclosures have been brought into communication with one another.

It goes without saying that the invention is not restricted to the embodiment described hereinabove by way of example but that, on the contrary, it encompasses all alternative forms of embodiment thereof that fall within the field of protection defined by the claims appended hereto.

The invention claimed is:

1. A sterile enclosure configured to be placed in communication with a second sterile enclosure so as to allow objects to be transferred from one enclosure to the other, characterized in that said sterile enclosure comprises:
    a flange for selective engagement with a second sterile enclosure, an opening being defined in said flange for permitting communication between the sterile enclosure and a second sterile enclosure;
    a protective component including a circular portion from which extends outwardly a frustoconical portion, said protective component being selectively movable to a contactless covering position in which said frustoconical portion at least partially extends into said opening, said protective component having a passage defined therethrough to permit objects to be transferred between the sterile enclosure and a second sterile enclosure, wherein, with said protective component being in said contactless covering position, said protective component extends completely through said opening of said flange with said frustoconical portion being configured to be interposed between said passage and an interface defined between said flange and a second sterile enclosure engaging said flange so as to cover the interface without contacting the interface or surrounding elements, wherein a portion of said protective component abuts said flange when positioned in the contactless covering position; and,
    at least one arm for supporting the protective component, which said arm is connected to said protective component and to a wall of the sterile enclosure, said arm allowing the protective component to be moved between said contactless covering position and a retracted position, said arm being mounted so that said arm can pivot on the wall of the sterile enclosure.

2. The sterile enclosure as claimed in claim 1, characterized in that said sterile enclosure comprises a door for selectively sealably closing said opening defined in said flange.

3. The sterile enclosure as claimed in claim 2, characterized in that said door is movable from said closed position to a retracted position in the sterile enclosure.

4. The sterile enclosure as claimed in claim 2, characterized in that said door is supported by an arm, said arm is connected to said door and connected to a wall of the sterile enclosure, said arm allowing the door to be moved between said closed position and a retracted position in the sterile enclosure.

5. The sterile enclosure as claimed in claim 1, characterized in that said sterile enclosure comprises means allowing the protective component to be immobilized in said contactless covering position.

6. The sterile enclosure as claimed in claim 5, characterized in that the means of immobilizing the protective component in said contactless covering position comprises at least one latch.

7. The sterile enclosure as claimed in claim 5, characterized in that said means of immobilizing the protective component in said contactless covering position including blocking or clamping means.

8. The sterile enclosure as claimed in claim 7, characterized in that said blocking or clamping means acting between said axle about which said arm pivots and a bracket used for mounting said axle to the wall of the sterile enclosure.

9. The sterile enclosure as claimed in claim 7, characterized in that said blocking or clamping means acting between said arm supporting the protective component and an axle about which said arm pivots.

10. The sterile enclosure as claimed in claim 1, characterized in that the protective component is positioned within the sterile enclosure when in the retracted position.

11. A sterile enclosure configured to be placed in communication with a second sterile enclosure so as to allow objects to be transferred from one enclosure to the other, the sterile enclosure comprising:
- a flange configured to be selectively engaged with a second sterile enclosure, the flange defining an opening for permitting communication between the sterile enclosure and a second sterile enclosure;
- a protective device including an annular component having a circular portion and a protruding portion extending axially from the circular portion, the protective device having a retracted position where the protective device is positioned within the sterile enclosure and a contactless covering position where the protruding portion of the protective device at least partially extends into the opening of the flange, the protective device defining a passage to permit objects to be transferred between the sterile enclosure and a second sterile enclosure, wherein, with the protective device in the contactless covering position, the protruding portion of the protective device is configured to be positioned between the passage of the protective device and an interface defined between the flange and a second sterile enclosure engaging the flange to cover the interface without contacting the interface, wherein a portion of the protective device abuts the flange when positioned in the contactless covering position; and
- at least one arm connected to the protective device and to a wall of the sterile enclosure, the at least one arm allowing the protective device to be moved between the contactless covering position and the retracted position, the at least one arm being mounted so that said at least one arm can pivot on the wall of the sterile enclosure.

12. The sterile enclosure as claimed in claim 11, wherein the protruding portion of the protective device is frustoconical.

13. The sterile enclosure as claimed in claim 11, wherein the sterile enclosure comprises a door for selectively sealably closing the opening defined in the flange.

14. The sterile enclosure as claimed in claim 13, wherein the door is movable from a closed position to a retracted position in the sterile enclosure.

15. The sterile enclosure as claimed in claim 13, wherein the door is supported by an arm, said arm is connected to the door and connected to a wall of the sterile enclosure, the arm allowing the door to be moved between the closed position and the retracted position in the sterile enclosure.

16. The sterile enclosure as claimed in claim 11, wherein the sterile enclosure comprises means allowing the protective component to be immobilized in said contactless covering position.

17. The sterile enclosure as claimed in claim 11, wherein a portion of the protective device extends completely through the opening of the flange.

* * * * *